(12) United States Patent
Gericke

(10) Patent No.: US 6,202,879 B1
(45) Date of Patent: Mar. 20, 2001

(54) FUEL CAP ASSEMBLY

(75) Inventor: Michael Gericke, Schomberg (CA)

(73) Assignee: Tesma International Inc., Concord (CA)

( * ) Notice: Subject to any disclaimer, the term of this patent is extended or adjusted under 35 U.S.C. 154(b) by 0 days.

(21) Appl. No.: 09/291,231

(22) Filed: Apr. 13, 1999

Related U.S. Application Data

(60) Provisional application No. 60/081,515, filed on Apr. 13, 1998.

(51) Int. Cl.$^7$ .......................... B65D 51/18; B65D 53/02; B65D 55/16
(52) U.S. Cl. .......................... 220/255; 220/281; 220/304; 220/375; 220/DIG. 33
(58) Field of Search .................................. 220/255, 86.2, 220/256, 281, 288, 202, 203.01, 203.02, 203.04, 203.06, 203.19, 203.22, 203.23, 203.24, 203.26, 203.27, 203.28, 203.29, 304, 375, DIG. 32, DIG. 33; 215/204, 217, 219, 305, 295, 330

(56) References Cited

U.S. PATENT DOCUMENTS

| | | | | |
|---|---|---|---|---|
| 3,666,137 | * | 5/1972 | Blau et al. ............................ | 220/288 |
| 3,815,776 | * | 6/1974 | MacMillan .......................... | 220/288 |
| 3,820,680 | | 6/1974 | Friend . | |
| 3,885,712 | * | 5/1975 | Libit .................................... | 215/219 |
| 3,907,155 | * | 9/1975 | Smith et al. ......................... | 220/288 |
| 3,937,357 | | 2/1976 | Burgess . | |
| 4,299,102 | | 11/1981 | Aro . | |
| 4,494,673 | * | 1/1985 | Hirashi ................................ | 220/288 |
| 4,676,390 | | 6/1987 | Harris . | |
| 4,676,393 | * | 6/1987 | Daniel ................................. | 220/281 |
| 4,809,869 | * | 3/1989 | Cosgrove et al. ................... | 220/288 |
| 4,830,058 | * | 5/1989 | Harris .................................. | 220/281 |
| 5,344,035 | * | 9/1994 | Manera ............................... | 215/219 |
| 5,480,055 | | 1/1996 | Harris et al. . | |
| 5,522,456 | | 6/1996 | Valk . | |
| 5,845,800 | * | 12/1998 | Shaw et al. ......................... | 220/86.2 |
| 6,029,835 | * | 2/2000 | DeJonge ............................. | 215/220 |

FOREIGN PATENT DOCUMENTS

WO9734813   9/1997   (WO) .

* cited by examiner

Primary Examiner—Allan N. Shoap
Assistant Examiner—Niki M. Eloshway
(74) Attorney, Agent, or Firm—Howard & Howard

(57) ABSTRACT

A fuel cap assembly for use with a filler neck of a fuel tank. The cap assembly includes a tubular housing having a shaft. The housing secures the cap assembly to the filler neck of the fuel tank. An exterior cover is mounted to the housing for relative rotation about the housing. The cover has an integral hollow handle. The cap assembly is characterized by a pair of actuating fingers movably mounted within the handle. The fingers engage the shaft of the housing to selectively interlock the cover to the housing. A lost motion connection is created between the cover and the housing when the fingers are in a non-engaged position. When the fingers are squeezed to an engaged position, the cover is interlocked to the housing and rotation of the cover imparts rotation upon the housing.

18 Claims, 2 Drawing Sheets

FUEL CAP ASSEMBLY

RELATED APPLICATION

This application claims priority to and all the benefits of U.S. Provisional Patent Application Ser. No. 60/081,515 filed on Apr. 13, 1998 and entitled "Fuel Cap".

BACKGROUND OF THE INVENTION

1) Technical Field

The subject invention relates to removable fuel caps for automotive fuel tanks.

2) Description of the Prior Art

Most vehicle fuel tanks include a filler neck extending from the tank to allow a user to refill the tank with fuel. Some type of cap or cover is placed over the filler neck in order to seal the fuel tank from the atmosphere. The most common type of cover is a removable fuel cap or gas cap.

Conventional removable fuel caps typically include a housing for threading onto the filler neck and a handle rotatably mounted to the housing. The housing usually includes at least one seal for sealing engagement with the filler neck. Many of these removable fuel caps have ratcheting mechanisms disposed between the handle and the housing wherein the handle may rotate about the housing. The ratcheting mechanisms ensure that only a predetermined amount of torque is applied to the housing. In other words, the housing cannot be overtightended to the filler neck. Overtightening of the housing could increase the compression of the gasket and prematurely age the gasket. Examples of such mechanisms are shown in U.S. Pat. Nos. 3,820,680; 4,299,102; and 4,676,390.

Other conventional fuel caps may also include a "lost motion" feature between the handle and the housing. The lost motion connection provides a level of safety in the event of an impact. Specifically, the handle can rotate independently of the housing such that the seal of the housing remains in sealing engagement with the filler neck. An example of such a design is illustrated in U.S. Pat. No. 5,480,055. The prior art fuel cap designs which incorporate lost motion features suffer from a number of deficiencies. One deficiency is the relative complexity of the design which equates to costly manufacturing and assembly. Another deficiency relates to the limitations of the lost motions connects, primarily the limited rotational distance in which the handle may rotate relative to the housing.

SUMMARY OF THE INVENTION AND ADVANTAGES

A fuel cap assembly for use with a filler neck of a fuel tank. The cap assembly comprises a housing for removably securing and sealing the cap assembly to the filler neck of the fuel tank. An exterior cover is rotatably mounted to the housing for relative rotation about the housing. The cap assembly is characterized by at least one actuating finger movably mounted within the cover and selectively engageable with the housing to selectively interlock the cover to the housing wherein the rotation of the cover imparts rotation upon the housing.

Accordingly, the subject invention provides a lost motion connection between the cover and the housing which inexpensive to manufacture and relatively easy to assemble. In addition, the lost motion connection allows the cover to rotate relative to the housing in either rotational direction through a complete 360°. The actuating finger provides an efficient means for eliminating a conventional lost motion connection and interlocking the cover to the housing when rotation of the housing is desired.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
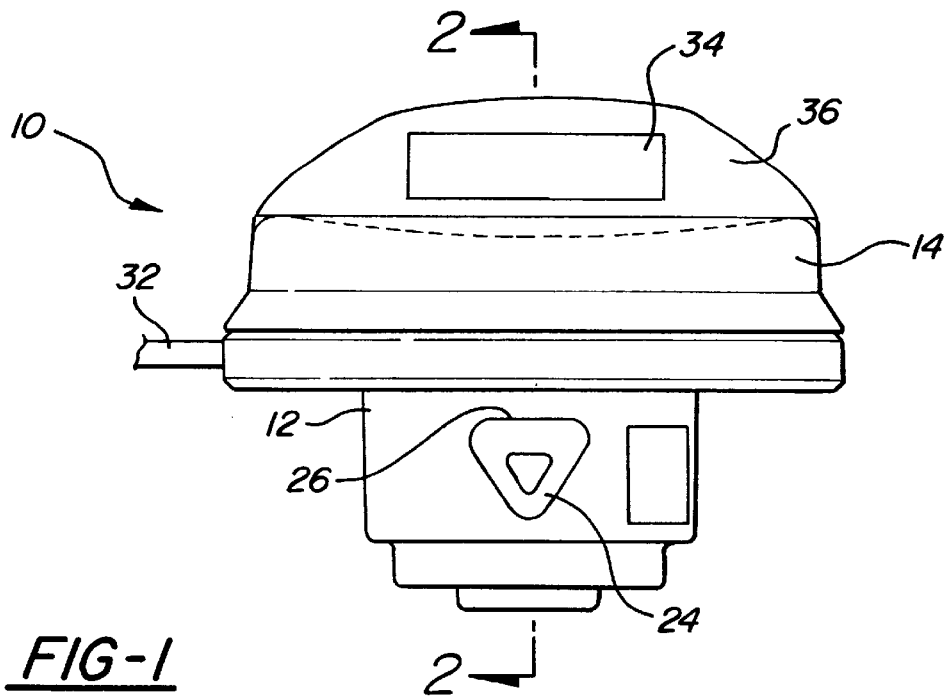
FIG. 1 is a side view of a fuel cap assembly incorporating the subject invention.
Figure 2:
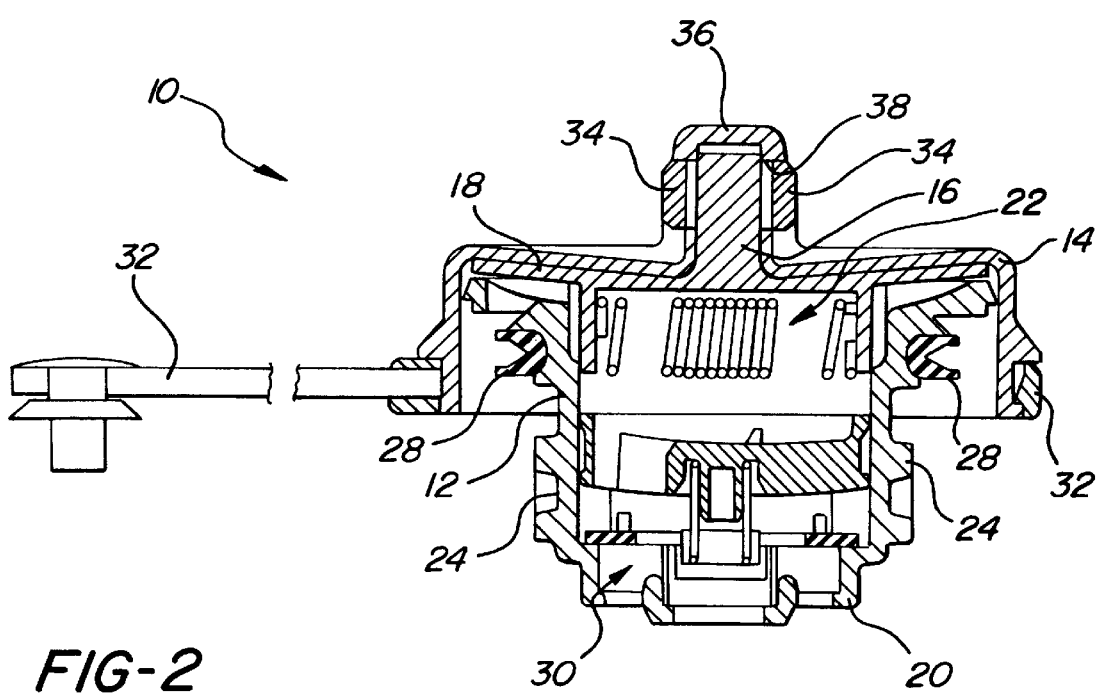
FIG. 2 is a cross-sectional view taken along line 2—2 of FIG. 1.

Referring to the Figures, wherein like numerals indicate like or corresponding parts throughout the several views, a fuel cap assembly is generally shown at 10 in FIGS. 1 and 2. The fuel cap assembly 10 is used to seal a filler neck of a fuel tank (not shown). More specifically, the fuel cap assembly 10 caps or plugs the filler neck such that the fuel tank is adequately sealed from the atmosphere.

The fuel cap assembly 10 comprises a housing 12 for removably securing the cap assembly 10 to the filler neck of the fuel tank. An exterior cover 14 is rotatably mounted to the housing 12 for relative rotation about the housing 12. A shaft 16 extends outwardly from the housing 12 with the cover 14 surrounding the shaft 16 for relative rotation about the shaft 16. As shown in FIG. 2, the housing 12 includes a torque transmitting portion 18 and a tubular portion 20 with the torque transmitting portion 18 rotatably mounted to the tubular portion 20. Preferably, the shaft 16 extends from the torque transmitting portion 18 for selective engagement by the cover 14. The torque transmitting portion 18 is generally disc shaped and is sized to receive the cover 14.

A ratchet mechanism, generally shown at 22, is disposed between the torque transmitting portion 18 and the tubular portion 20 of the housing 12 wherein a predetermined level of rotating torque is transferred from the torque transmitting portion 18 to the tubular portion 20 when the tubular portion 20 engages the filler neck. The ratcheting mechanism 22 ensures that only a predetermined amount of torque is applied to the housing 12. In other words, the housing 12 cannot be overtightended to the filler neck. Overtightening of the housing 12 could reduce the effectiveness of the sealing engagement with the filler neck. As appreciated, ratchet mechanisms typically operate in only one direction, i.e., the clockwise or installing direction. The specifics of the ratchet mechanism 22 form the subject matter of an independent invention which is disclosed and claimed in WO 97/34813 and assigned to the assignee hereof.

At least a pair of locking elements 24 are mounted to the tubular portion 20 of the housing 12 for selective engagement with the filler neck to secure the housing 12 and the cover 14 to the filler neck. Specifically, the locking elements 24 extend from diametrically opposite ends of the tubular portion 20 of the housing 12. Each locking element 24 preferably has a triangular hollow configuration with an upper side 26 of the triangle extending downward slightly at an angle. The downwardly angling side 26 engages a corresponding flange (not shown) extending from the filler neck wherein the housing 12 may be securely locked to the filler neck. As appreciated, there may be any number of locking elements 24 of any suitable design or configuration. In fact the locking elements 24 as shown in the Figures may be eliminated and replaced by a set of threads without deviating from the overall scope of the subject invention.

A seal 28 is mounted to the tubular portion 20 of the housing 12 for sealing engagement with the filler neck. Preferably, the seal 28 is an annular compressible seal 28 which engages with an exterior rim of the filler neck to seal the fuel tank. In the broadest aspect of the subject invention, the housing 12 can have a solid bottom wall which would simply close off the filler neck. In the preferred embodiment, however, the housing 12 is substantially hollow and includes a valve mechanism, generally shown at 30. The valve mechanism 30 is disposed within the tubular portion 20 of the housing 12 below the torque transmitting portion 18 for continuously maintaining a predetermined pressure within the fuel tank. A filter (not numbered) is also included for filtering any incoming and outgoing air through the valve mechanism 30. The seal 28 and valve mechanism 30 may be of any design or configuration as is known in the art.

A tether 32 is mounted to the cover 14 for securing the cover 14 to an outside surface of the filler neck when the cover 14 and the housing 12 are removed from the filler neck. Specifically, an integral notch (not numbered) is formed within the cover 14 for securing the tether 32 to the cover 14.

The fuel cap assembly 10 is characterized by at least one actuating finger 34 movably mounted within the cover 14 and selectively engageable with the housing 12 to selectively interlock the cover 14 to the housing 12 wherein the rotation of the cover 14 imparts rotation upon the housing 12. Specifically, the cover 14 includes a diametrically extending hollow handle 36 with the actuating finger 34 disposed within the handle 36. The shaft 16 extends into the handle 36 for alignment with the finger 34 such that the finger 34 selectively engages the shaft 16. Preferably, there are a pair of actuating fingers 34 mounted within the handle 36 of the cover 14 for surrounding the shaft 16.

Figure 3:
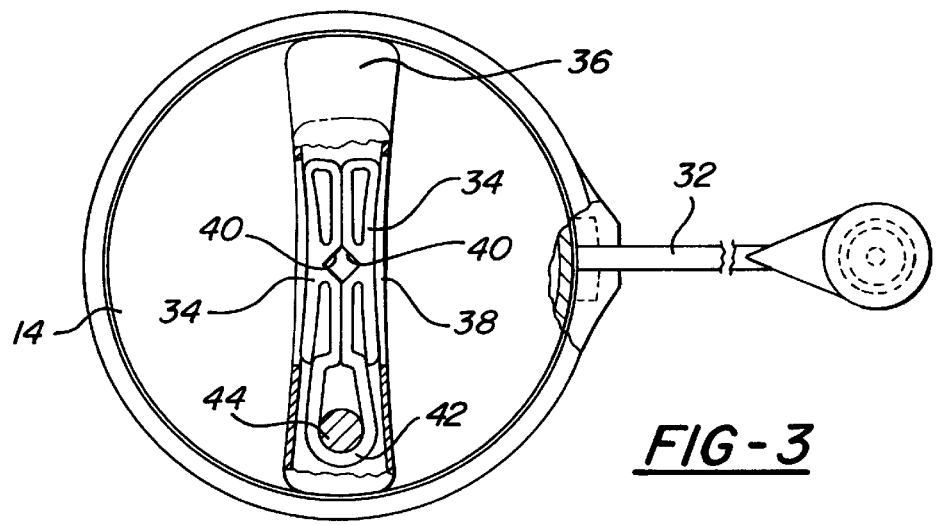
FIG. 3 is a partially cross-sectional top view of the fuel cap with a pair of actuating fingers in an installed position.
Figure 4:
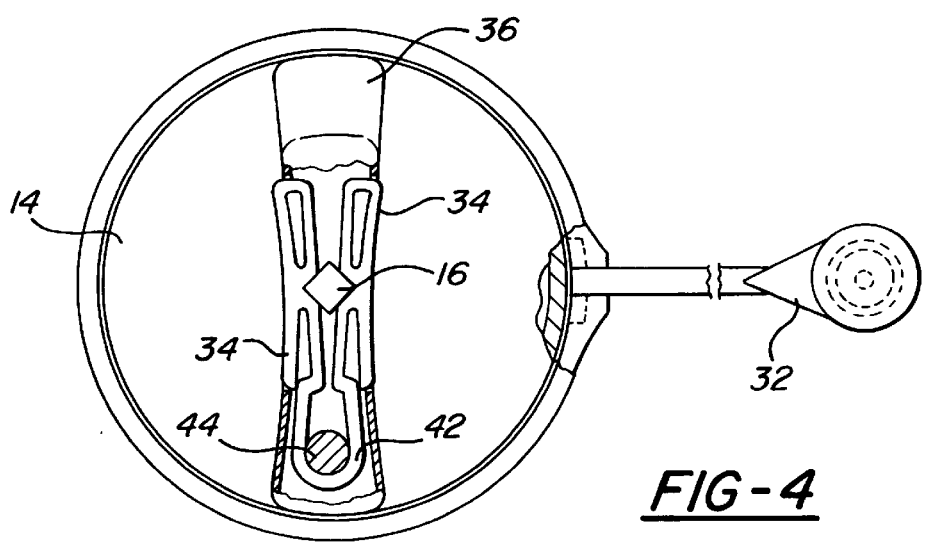
FIG. 4 is a partially cross-sectional top view of the fuel cap with the fingers in an engaged position.
Figure 5:
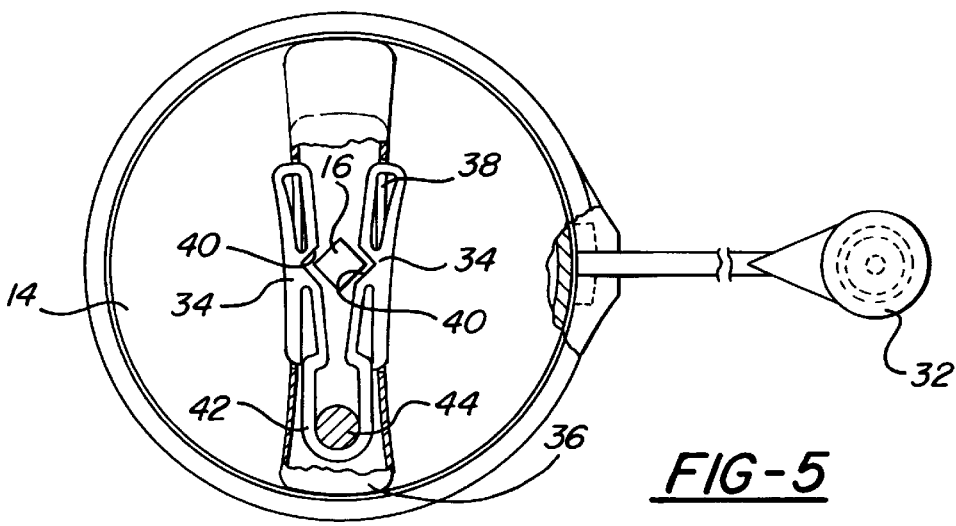
FIG. 5 is a partially cross-sectional top view of the fuel cap with the fingers in a non-engaged position.

The cover 14 preferably includes a pair of integral apertures 38 disposed on opposite sides. Referring also to FIGS. 3 through 5, the fingers 34 are movably disposed within the apertures 38 for movement between a non-engaged position with the fingers 34 at least partially extending outside of the handle 36 (FIG. 5) and an engaged position with the fingers 34 engaging the shaft 16 (FIG. 4). The engagement of the fingers 34 with the shaft 16 creates the interlocking engagement of the cover 14 to the housing 12. The non-engagement of the fingers 34 creates a lost motion connection between the cover 14 and the housing 12 such that the cover 14 may rotate freely about the housing 12.

As best shown in FIGS. 3 through 5, each of the fingers 34 includes an engaging surface 40. Specifically, each of the engaging surfaces 40 include integrally formed grooves 40 disposed within the fingers 34 with the shaft 16 disposed between the grooves 40 of the fingers 34. In the preferred embodiment, the shaft 16 has a substantially square configuration. The grooves 40 of the engaging surfaces 40 correspondingly have substantially V-shaped configurations for selective driving engagement with the square shaped shaft 16. As appreciated, other driving engagements may be utilized such as spline, hexagon, rectangular, etc. so long as the shaft 16 and engaging surfaces 40 of the fingers 34 have a complementary configuration wherein the shaft 16 and the fingers 34 can interlock.

A connecting member 42 interconnects the pair of fingers 34 for continuously biasing the fingers 34 toward a non-engaged position away from the shaft 16. In other words, the fingers 34 are preferably integral with each other. As appreciated, the fingers 34 may be biased away from the shaft 16 to any suitable position so long as the shaft 16 can freely rotate about the fingers 34. A pin 44 extends from the cover 14 and engages the connecting member 42 to secure the connecting member 42 to the cover 14. Specifically, the pin 44 extends downwardly from the upper inside surface (not numbered) of the hollow handle 36.

Referring specifically to FIGS. 3 through 5, the assembling of the fuel cap 10 is discussed in detail. First the connecting member 42 is placed over the pin 44 and the fingers 34 are compressed (FIG. 3). The cover 14 is then placed over the fingers 34 until the fingers 34 are able to extend out of the apertures 38. Once positioned, the fingers 34 will be biased outwardly by the connecting member 42 out of engagement with the shaft 16 to the non-engaged position (FIG. 5). As discussed above, the fingers 34 may have any suitable non-engaged position within the handle 36 and FIG. 5 is simply illustrative of this feature. In the non-engaged condition, the cover 14 can rotate relative to the housing 12 without imparting a rotational force on the housing 12. As appreciated, the cover 14 can rotate a complete 360° about the housing 12 in either rotational direction.

To install or remove the fuel cap assembly 10, the user must squeeze the fingers 34 on the handle 36 together until the shaft 16 is fully seated in the grooves 40. The interlocking of the fingers 34 and shaft 16 must be sufficiently tight in order to eliminate any slipping. The rotational force exerted by the user must be sufficient to develop the necessary rotational torque to rotate the housing 12. Specifically, rotation of the handle 36 and fingers 34 rotates the cover 14. The engagement of the fingers 34 with the shaft 16 in turn rotates the torque transmission portion 18. The torque transmission portion 18, through the ratcheting mechanism 22, transfers the rotational torque from the cover 14 to the housing 12. During installation, the rotation of the housing 12 and cover 14 will continue until the housing 12 is securely locked to the filler neck. In this condition, the ratchet mechanism 22 begins to operate wherein additional rotation of the cover 14 no longer transmits rotation to the housing 12. The user will hear a clicking noise to indicate that the installation of the fuel cap assembly 10 is complete. During removal, the rotation of the housing 12 and cover 14 continues until the cap assembly 10 is completely removed from the filler neck. As discussed above, the ratchet mechanism 22 does not operate when the cover 14 is rotated in the counter-clockwise or removal direction. The tether 32 maintains the fuel cap assembly 10 in close proximity to the filler neck wherein the user may reinstall the fuel cap assembly 10 in accordance with the steps outlined above.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that within the scope of the appended claims the invention may be practiced otherwise than as specifically described.

What is claimed is:

1. A fuel cap assembly for use with a filler neck of a fuel tank, said cap assembly comprising;
   a housing for removably securing and sealing said cap assembly to the filler neck of the fuel tank;
   an exterior cover rotatably mounted to said housing for relative rotation about said housing;
   a hollow handle extending outwardly from said cover;
   at least one actuating finger movably mounted within said hollow handle; and
   a shaft mounted to said housing and extending from said housing into said handle with said finger aligning with said shaft and being selectively engageable with said shaft to interlock said cover to said housing wherein said rotation of said handle and said cover imparts rotation upon said housing.

2. The cap assembly as set forth in claim 1 wherein said cover includes a hollow handle with said actuating finger disposed within said handle.

3. The cap assembly as set forth in claim 1 further including a pair of actuating fingers mounted within said handle of said cover for surrounding said shaft.

4. The cap assembly as set forth in claim 3 wherein said cover includes a pair of integral apertures with said fingers movably disposed within said apertures for movement between a non-engaged position with said fingers at least partially extending outside of said handle and an engaged position with said fingers engaging said shaft.

5. The cap assembly as set forth in claim 3 wherein each of said fingers includes an engaging surface.

6. The cap assembly as set forth in claim 5 wherein each of said engaging surfaces include integrally formed grooves disposed within said fingers.

7. The cap assembly as set forth in claim 6 wherein said shaft is disposed between said grooves of said fingers.

8. The cap assembly as set forth in claim 7 wherein said shaft has a substantially square configuration.

9. The cap assembly as set forth in claim 8 wherein said grooves of said engaging surfaces have substantially V-shaped configurations for selective engagement with said square shaped shaft.

10. The cap assembly as set forth in claim 3 further including a connecting member interconnecting said pair of fingers for continuously biasing said fingers toward a non-engaged position away from said shaft.

11. The cap assembly as set forth in claim 10 further including a pin extending from said cover and engaging said connecting member to secure said connecting member to said cover.

12. The cap assembly as set forth in claim 3 wherein said housing includes a torque transmitting portion and a tubular portion with said torque transmitting portion rotatably mounted to said tubular portion.

13. The cap assembly as set forth in claim 12 further including a ratchet mechanism disposed between said torque transmitting portion and said tubular portion of said housing wherein a predetermined level of torque is transferred from said torque transmitting portion to said tubular portion when said tubular portion engages the filler neck.

14. The cap assembly as set forth in claim 13 further including at least a pair of locking elements mounted to said tubular portion of said housing for selective engagement with the filler neck to secure said housing and said cover to the filler neck.

15. The cap assembly as set forth in claim 14 further including a seal mounted to said tubular portion of said housing for sealing engagement with the filler neck.

16. The cap assembly as set forth in claim 15 further including a valve mechanism disposed within said tubular portion of said housing below said torque transmitting portion for continuously maintaining a predetermined pressure within the fuel tank.

17. The cap assembly as set forth in claim 3 further including a tether mounted to said cover for securing said cover to an outside surface of the filler neck when said cover and said housing are removed from the filler neck.

18. The cap assembly as set forth in claim 17 further including an integral notch formed within said cover for securing said tether to said cover.

* * * * *